(12) United States Patent
Grossman

(10) Patent No.: US 12,198,248 B2
(45) Date of Patent: Jan. 14, 2025

(54) SYSTEMS AND METHODS FOR RAY TRACING ACCELERATION STRUCTURE LEVEL OF DETAIL PROCESSING

(71) Applicant: Microsoft Technology Licensing, LLC, Redmond, WA (US)

(72) Inventor: Mark S. Grossman, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 17/900,192

(22) Filed: Aug. 31, 2022

(65) Prior Publication Data

US 2024/0070960 A1 Feb. 29, 2024

(51) Int. Cl.
*G06T 15/00* (2011.01)
*G06T 15/06* (2011.01)
*G06T 15/08* (2011.01)

(52) U.S. Cl.
CPC ............ *G06T 15/005* (2013.01); *G06T 15/06* (2013.01); *G06T 15/08* (2013.01); *G06T 2210/36* (2013.01)

(58) Field of Classification Search
CPC ....... G06T 15/005; G06T 15/06; G06T 15/08; G06T 2210/36
See application file for complete search history.

(56) References Cited

U.S. PATENT DOCUMENTS

2012/0038657 A1* 2/2012 Grossman ............... G06T 15/04
345/585
2024/0009226 A1* 1/2024 Muthler ............... A61K 31/714

* cited by examiner

*Primary Examiner* — William A Beutel
(74) *Attorney, Agent, or Firm* — Ranjeev Singh; Singh Law, PLLC

(57) ABSTRACT

Systems and methods for ray tracing acceleration structure level of detail processing are described. An example graphics processing system is to retrieve a first level of detail value for a sub-tree from a level of detail residency map corresponding to a bounding volume hierarchy of objects. The graphics processing system is to determine a second level of detail value for the sub-tree. The graphics processing system is to select a final level of detail value for the sub-tree based on a comparison between the first level of detail value for the sub-tree and the second level of detail value for the sub-tree. The graphics processing system is to, based on the final level of detail value for the sub-tree, select child nodes in an acceleration structure tree and trace the selected child nodes.

20 Claims, 9 Drawing Sheets

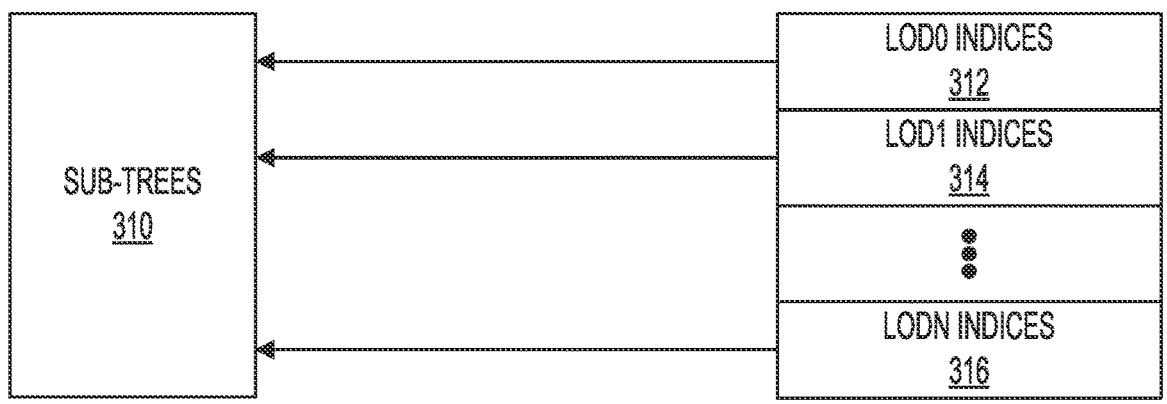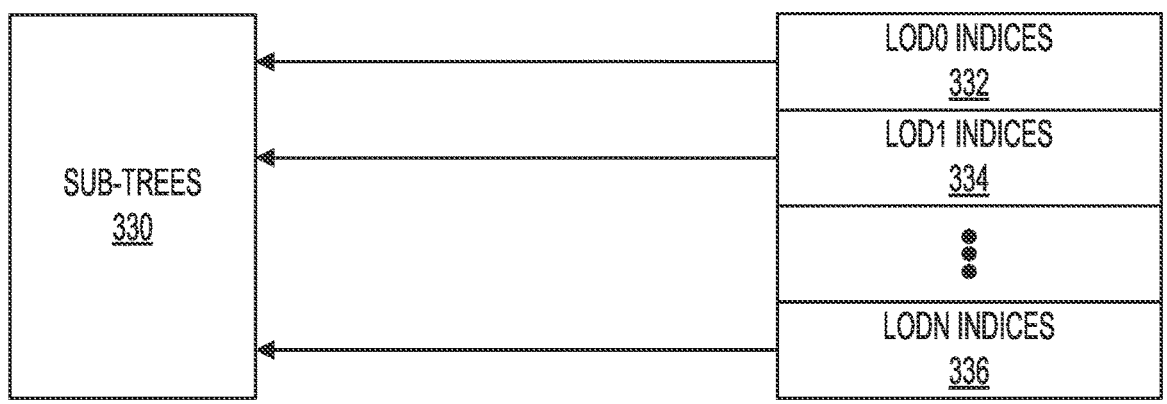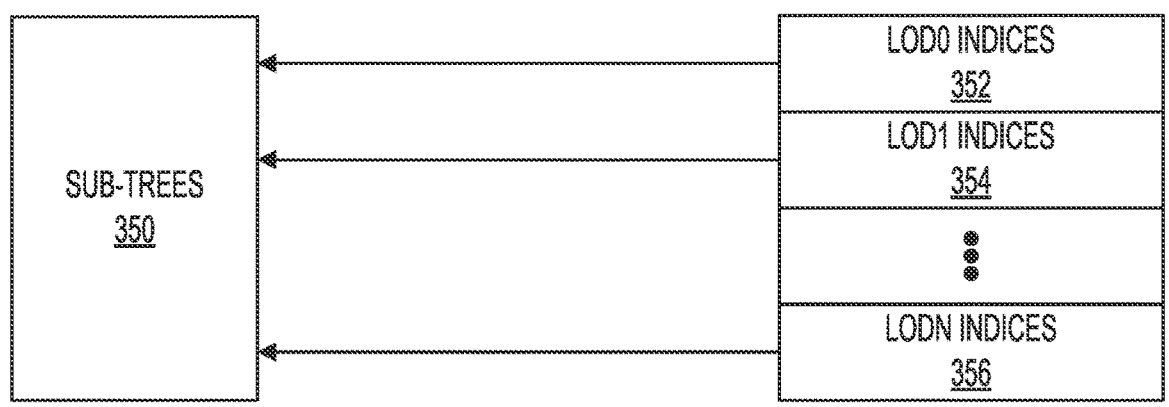
FIG. 3

RETRIEVING A FIRST LEVEL OF DETAIL VALUE FOR A SUB-TREE FROM A LEVEL OF DETAIL RESIDENCY MAP CORRESPONDING TO A BOUNDING VOLUME HIERARCHY OF OBJECTS — 810

DETERMINING A SECOND LEVEL OF DETAIL VALUE FOR THE SUB-TREE — 820

SELECTING A FINAL LEVEL OF DETAIL VALUE FOR THE SUB-TREE BASED ON A COMPARISON BETWEEN THE FIRST LEVEL OF DETAIL VALUE FOR THE SUB-TREE AND THE SECOND LEVEL OF DETAIL VALUE FOR THE SUB-TREE — 830

BASED ON THE FINAL LEVEL OF DETAIL VALUE FOR THE SUB-TREE, SELECTING CHILD NODES IN AN ACCELERATION STRUCTURE TREE AND TRACING THE SELECTED CHILD NODES — 840

```
┌─────────────────────────────────────────────────────────────────────────┐
│  FOR EACH BOUNDING VOLUME ASSOCIATED WITH A SET OF RAYS FOR A FRAME,    │
│  TESTING EACH OF THE SET OF RAYS AGAINST THE BOUNDING VOLUME TO         │
│  DETERMINE AN INTERSECTION                                              │
└─────────────────────────────────────────────────────────────────────────┘
                                    │  910
                                    ▼
┌─────────────────────────────────────────────────────────────────────────┐
│  UPON DETERMINING AN INTERSECTION BETWEEN A RAY AND THE BOUNDING        │
│  VOLUME AND UPON DETERMINING THAT A LEVEL OF DETAIL PROCESSING IS       │
│  REQUIRED FOR THE BOUNDING VOLUME:                                      │
│                                                                         │
│       DETERMINING A COMPUTED LEVEL OF DETAIL VALUE FOR A SUB-TREE       │
│  INDEXED BY THE BOUNDING VOLUME,                                        │
│       RETRIEVING A RESIDENT LEVEL OF DETAIL VALUE FOR THE SUB-TREE      │
│  INDEXED BY THE BOUNDING VOLUME,                                        │
│       DETERMINING A FINAL LEVEL OF DETAIL VALUE BASED ON A COMPARISON   │
│  BETWEEN THE COMPUTED LEVEL OF DETAIL VALUE FOR THE SUB-TREE AND THE    │
│  RESIDENT LEVEL OF DETAIL VALUE FOR THE SUB-TREE, AND                   │
│       BASED ON THE FINAL LEVEL OF DETAIL VALUE, SELECTING CHILD NODES   │
│  IN AN ACCELERATION STRUCTURE TREE FOR THE BOUNDING VOLUME AND          │
│  TRACING THE SELECTED CHILD NODES IN THE ACCELERATION STRUCTURE TREE    │
└─────────────────────────────────────────────────────────────────────────┘
                                                                    920
                                      900
```

FIG. 9

SYSTEMS AND METHODS FOR RAY TRACING ACCELERATION STRUCTURE LEVEL OF DETAIL PROCESSING

BACKGROUND

Increasingly, as part of video games and other such applications, the acceleration structures for ray tracing are explicitly edited or regenerated by the software to reflect the current set of potentially visible geometry. Such acceleration structures are now competing for storage (both persistent (e.g., flash memory) and non-persistent (e.g., RAM)) with other data, such as geometry and texture data.

Accordingly, there is a need for systems and methods for better handling of the data associated with the acceleration structures.

SUMMARY

In one example, the present disclosure relates to a graphics processing system to retrieve a first level of detail value for a sub-tree from a level of detail residency map corresponding to a bounding volume hierarchy of objects. The graphics processing system is to determine a second level of detail value for the sub-tree. The graphics processing system is to select a final level of detail value for the sub-tree based on a comparison between the first level of detail value for the sub-tree and the second level of detail value for the sub-tree. The graphics processing system is to, based on the final level of detail value for the sub-tree, select child nodes in an acceleration structure tree and trace the selected child nodes.

In another example, the present disclosure relates to a method implemented by a graphics processing system. The method includes for each bounding volume associated with a set of rays for a frame, testing each of the set of rays against the bounding volume to determine an intersection. The method further includes upon determining an intersection between a ray and the bounding volume and upon determining that a level of detail processing is required for the bounding volume: determining a computed level of detail value for a sub-tree indexed by the bounding volume, retrieving a resident level of detail value for the sub-tree indexed by the bounding volume, determining a final level of detail value based on a comparison between the computed level of detail value for the sub-tree and the resident level of detail value for the sub-tree, and based on the final level of detail value, selecting child nodes in an acceleration structure tree for the bounding volume and tracing the selected child nodes in the acceleration structure tree.

In yet another example, the present disclosure relates to a graphics processing system to, for each bounding volume associated with a set of rays for a frame, test each of the set of rays against the bounding volume to determine an intersection. The graphics processing system is further configured to, upon determining the intersection and upon determining that a level of detail processing is required for the bounding volume: determine a computed level of detail value for a sub-tree indexed by the bounding volume, retrieve a resident level of detail value for the sub-tree indexed by the bounding volume, determine a final level of detail value based on a comparison between the computed level of detail value for the sub-tree and the resident level of detail value for the sub-tree, and based on the final level of detail value, selecting child nodes in an acceleration structure tree for the bounding volume and tracing the selected child nodes in the acceleration structure tree.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 3 shows a diagram of a geometry node pool set up by the CPU for use by the GPU as part of ray tracing acceleration structure level of detail processing in accordance with one example;

FIG. 8 shows a flow chart of a method implemented by a graphics processing system in accordance with one example; and FIG. 9 shows another flow chart of a method implemented by a graphics processing system in accordance with one example.

DETAILED DESCRIPTION

Figure 1:
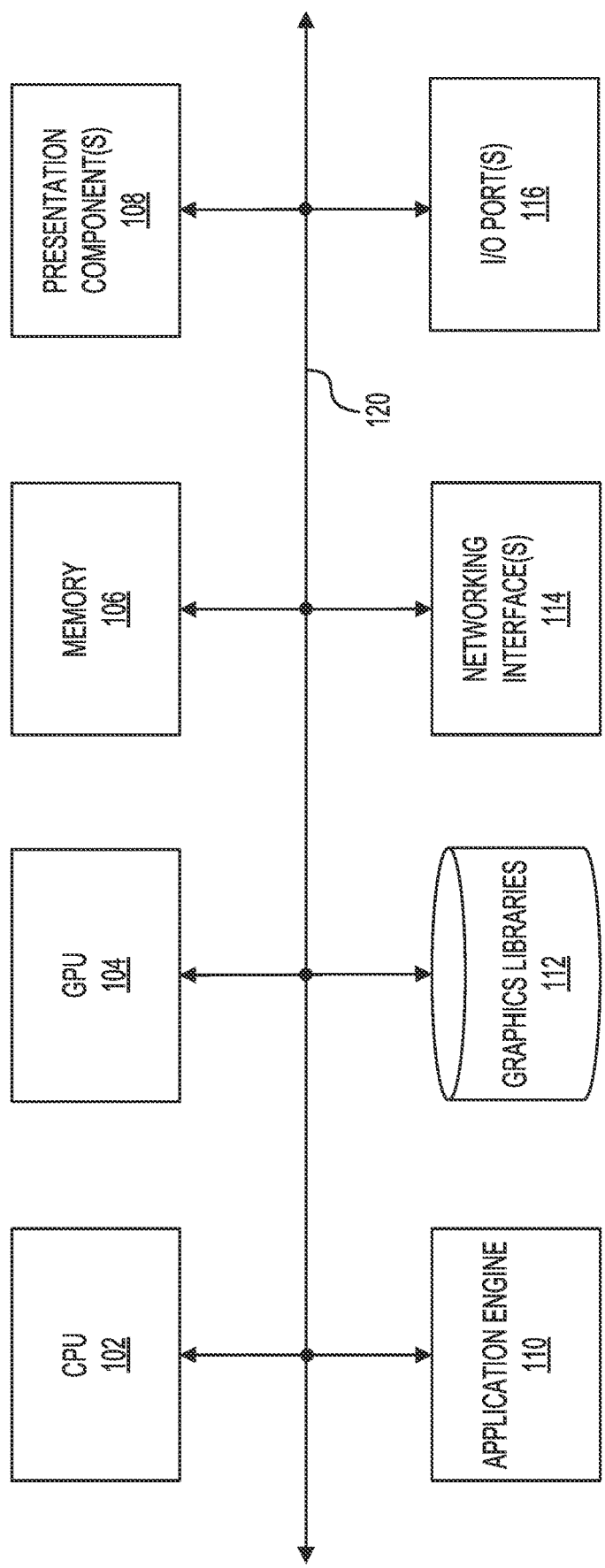
FIG. 1 shows a diagram of a system environment including a central processing unit (CPU) and a graphics processing unit (GPU) with ray tracing acceleration structure level of detail processing in accordance with one example.

Examples described in this disclosure relate to systems and methods with ray tracing acceleration structure level of detail processing. As noted earlier, increasingly as part of video games and other such applications the acceleration structures for ray tracing are explicitly edited or regenerated by the software to reflect the current set of potentially visible geometry. Such acceleration structures are now competing for storage (both persistent (e.g., flash memory) and non-persistent (e.g., RAM)) with other data, such as geometry and texture data. This growth in the share of the memory by the acceleration structures has resulted in systems with significantly large memory requirements. Moreover, the bandwidth required to fetch the large amount of data for acceleration structures has also proportionally gotten bigger. The systems and methods described herein help minimize the space required for ray tracing acceleration structures.

To address such problems, one solution is to have a more manageable pool of data associated with the acceleration structures. To have a more manageable pool, the acceleration structures can be managed with levels of detail for different geometry segments resident in the random access memory (RAM). This can be enhanced by letting the graphics processing unit (GPU) determine, in a current frame N, the projected size of each bounding volume in the acceleration structure that is hit by primary rays. This may need to be performed only once per bounding volume. The results of this determination may be collected in a table, or a linked list, organized by bounding volumes, where each bounding volume can be identified via a unique identifier. Software may use this list, so that it can adjust the amount of detail needed in frame N+1 for the enclosed geometry. One way this can be implemented is to let the needed level of detail (LOD) and any coarser LODs be concurrently resident in the acceleration structure pool, and by letting the software simply adjust pointers from the bounding volume to the required LOD. Another way this can be implemented is to just store the most detailed representation required; there is no downside to storing and pointing to a too-detailed LOD other than requiring unnecessary storage.

In certain examples described herein, such improvements are realized by using a residency map and a recording map to select only a subset of the acceleration structures. Initially, the residency map may be created by the CPU with one entry in the residency map per bounding volume. Each entry in the residency map may point to at least one location (e.g., via a pointer or via an index) of a level of detail for each existing sub-tree for a bounding volume in a geometry node pool created by the CPU. A sub-tree is a collection of nodes in a bounding volume hierarchy of objects. Each sub-tree may contain all of the nodes for the acceleration structure(s) corresponding to that sub-tree. Alternatively, the geometry node pool and the corresponding residency map may initially hold only entries for the coarsest levels of detail of each sub-tree. The recording map may be configured to store integer values representative of levels of detail for the nodes as determined by the GPU. The recording map may be maintained and created by the GPU to keep a record of the processing of the various sub-trees. After the completion of the processing of a frame, the recording map for that frame may be transferred to the host memory associated with the CPU. Both residency maps and recording maps may be indexed by a bounding volume ID.

In summary, a software-allocated and managed pool of resident bounding volume node data that contains the best level of detail (LOD) values for current and next frames to be shaded is created by the CPU. In one example, a process on the host CPU is used to evict unneeded sub-tree LODs (e.g., sub-tree LODs with too high a level of detail) and bring in needed sub-tree LODs from a backing store. A hardware LOD residency map with an entry per sub-tree is loaded into the GPU. The recording map maintained by the GPU is cleared to a value representing "empty," for example to the highest possible LOD value, before every frame. The residency map clamps the needed-LOD to the value of the resident LOD (i.e., the level needed may not have been brought into the memory pool). Then the resulting clamped LOD value is used to perform the shader processing in the GPU. The LOD recording map is read back to the host (or only portions of the map that were actually used are read) after the shader has finished processing. The host (e.g., the CPU) uses this to guide the eviction/fill of the managed geometry node pool.

FIG. 1 shows a diagram of a system environment 100 including a central processing unit (CPU) 102 and a graphics processing unit (GPU) 104 with ray tracing acceleration structure level of detail processing in accordance with one example. System environment 100 may further include memory 106, presentation component(s) 108, application engine 110, graphics libraries 112, networking interfaces 114, and I/O port(s) 116, which may be interconnected via one or more busses (e.g., bus 120) to each other and to CPU 102 and GPU 104. CPU 102 may execute instructions stored in memory 106. Memory 106 may be any combination of non-volatile storage or volatile storage (e.g., flash memory, DRAM, SRAM, or other types of memories). GPU 104 may read/write to memory 106 either directly or via a direct memory access (DMA) process. Presentation component(s) 108 may include displays, holographic devices, or other presentation devices. Displays may be any type of display, such as LCD, LED, or other types of display.

Still referring to FIG. 1, application engine 110 may include the graphics application and graphics libraries 112 may include the related libraries for use with application engine 110 and GPU 104. Network interface(s) 114 may include communication interfaces, such as Ethernet, cellular radio, Bluetooth radio, UWB radio, or other types of wireless or wired communication interfaces. I/O port(s) 116 may include Ethernet ports, Fiber-optic ports, wireless ports, or other communication or diagnostic ports. Although FIG. 1 shows system environment 100 as including a certain number of components arranged and coupled in a certain way, it may include fewer or additional components arranged and coupled differently. As an example, system environment 100 may include components such as sensors and user interface components. In addition, the functionality associated with system environment 100 may be distributed, as needed.

Figure 2:
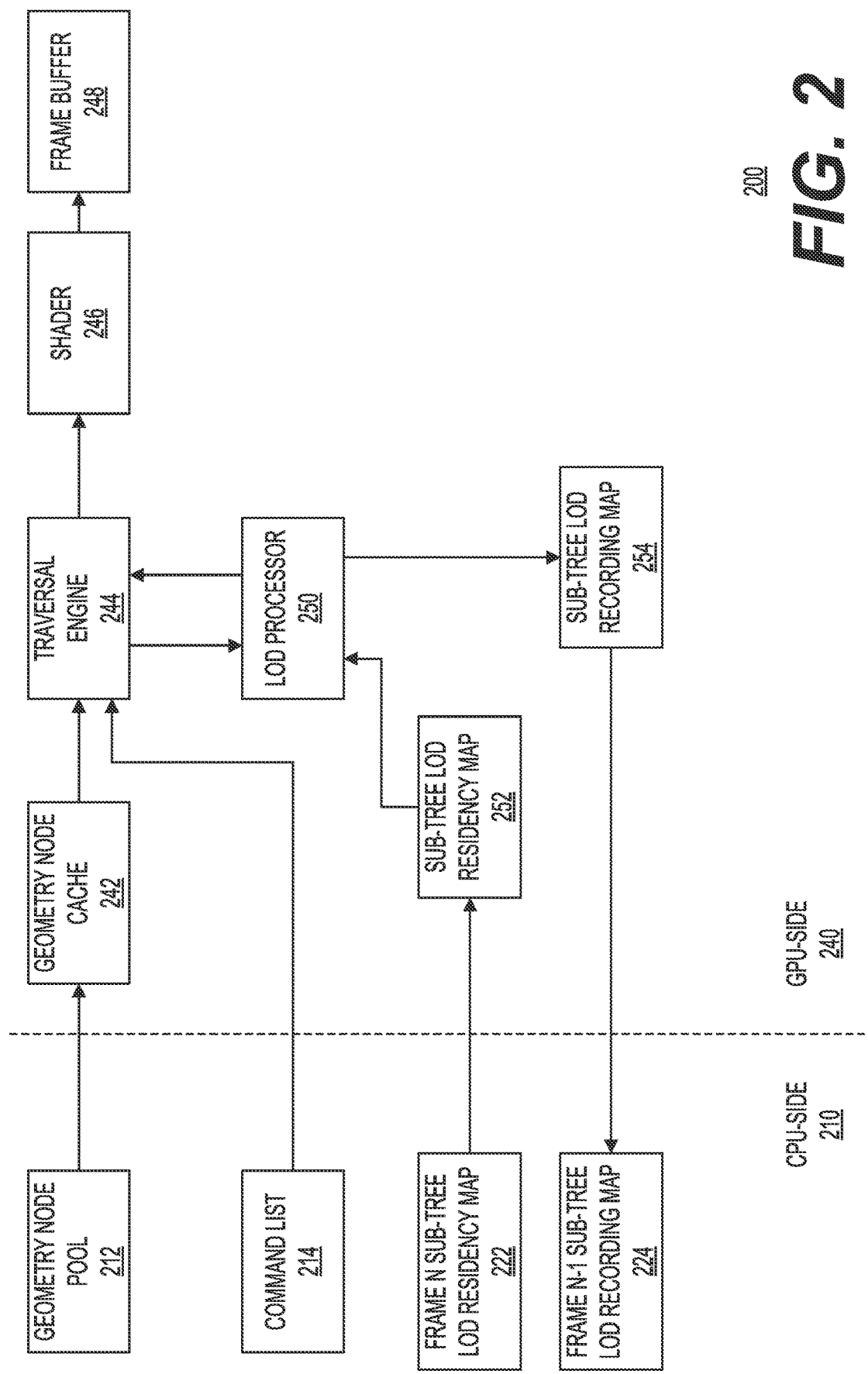
FIG. 2 shows a diagram of a graphics processing system with the data and the components on the CPU-side and the data and the components on the GPU-side with ray tracing acceleration structure level of detail processing in accordance with one example.

FIG. 2 shows a diagram of a graphics processing system 200 with the data and the components on the CPU-side 210 and the data and the components on the GPU-side 240 with ray tracing acceleration structure level of detail processing in accordance with one example. In this example, the CPU-side 210 of graphics processing system 200 may include geometry node pool 212, command list 214, frame N sub-tree LOD residency map 222, and frame N−1 sub-tree LOD recording map 224. Geometry node pool 212 may be a fixed-size pool of acceleration structures related data stored in the host memory (e.g., memory 106 of FIG. 1) associated with the CPU (e.g., CPU 102 of FIG. 1).

Geometry node pool 212 may include a bounding volume hierarchy (BVH) having a tree structure with one or more sub-trees per node. In one example, there may be a bounding box node, pointers to child nodes, and geometry (e.g., triangles) at the leaf nodes. As an example, geometry node pool 212 may include sub-trees with varying levels of detail (e.g., from the most detailed level to the least detailed level). A sub-tree includes at least one bounding volume at the "root" and at least one geometry leaf node. Certain sub-trees may correspond to an intermediate level of detail. The number of triangles per leaf node may be a measure of the level of detail. The data structures for the geometry may be loaded from a bulk storage (not shown) into the host memory as part of the geometry node pool 212. Once the initial objects in a scene are determined, the CPU may determine the initial bounding volume hierarchy (BVH) and build acceleration structures for the different LODs. The bounding volume hierarchy may be a tree structure with bounding box nodes, each having pointers to child nodes, and geometry at the leaf nodes. Having created the geometry node pool 212, the CPU (e.g., in response to directions from application engine 110 of FIG. 1) may also set up a command list 214 for processing on the GPU-side 240. Command list 212 may include ray tracing commands.

The CPU-side 210 may further include a residency map for each frame (e.g., frame N sub-tree LOD residency map 222) in geometry node pool 212 with at least one entry in the residency map per sub-tree. A sub-tree includes at least one bounding volume at the "root" and at least one geometry leaf node. Each entry in the residency map may contain an integer level of detail value for comparison with a calculated LOD value. Moreover, each entry in the residency map may also point to at least one location (e.g., via a pointer or via an index) of a level of detail for the sub-trees in a geometry node pool created by the CPU. The recording map may be configured to store integer values representative of levels of detail for the sub-trees as determined by the GPU. The recording map (e.g., frame N sub-tree (current frame) LOD recording map 254) may be maintained and created by the GPU to keep a record of the processing of the various sub-trees. After the completion of the processing of a frame, the recording map for that frame may be transferred to the host memory associated with the CPU. This then becomes the frame N–1 recording map 224.

With continued reference to FIG. 2, in this example, the GPU-side 240 of graphics processing system 200 may include geometry node cache 242, traversal engine 244, shader 246, frame buffer 248, LOD processor 250, sub-tree LOD residency map 252, and sub-tree LOD recording map 254. During processing of a scene only portions of the scene that are relevant for the frame or frames about to be drawn may be fetched by the GPU from geometry node pool 212. As an example, the fetched geometry may be stored in a geometry node cache 242.

FIG. 3 shows one example of fetched sub-trees 300 of the acceleration structure for a frame. The fetched geometry in geometry node cache 242 may include recently used or frequently used sub-trees for different portions of scene geometry. In one example, geometry node cache 242 may be implemented as a system level cache. As an example, as shown in FIG. 3, sub-trees 300 include sub-trees 310, sub-trees 330, and sub-trees 350. Sub-trees 310, 330, and 350 may correspond to different objects in a scene. A given sub-tree may have multiple LODs, and thus multiple sets of indices. In the example shown in FIG. 3, sub-trees 310 may have the following indices: LOD0 indices 312, LOD1 indices 314, and LODN indices 316. Each of the indices may point to sub-trees with differing levels of detail. Thus, LOD0 indices 312 may point to sub-trees with the highest level of detail. LOD1 indices 314 may point to vertices sub-trees with an intermediate level of detail and LODN indices 316 may point to sub-trees with the lowest level of detail. Sub-trees 330 may have the following indices: LOD0 indices 332, LOD1 indices 334, and LODN indices 336. Each of the indices may point to sub-trees with differing levels of detail. Thus, LOD0 indices 332 may point to sub-trees with the highest level of detail. LOD1 indices 334 may point to sub-trees with an intermediate level of detail and LODN indices 336 may point to vertices with the lowest level of detail. Sub-trees 350 may have the following indices: LOD0 indices 352, LOD1 indices 354, and LODN indices 356. Each of the indices may point to sub-trees with differing levels of detail. Thus, LOD0 indices 352 may point to sub-trees with the highest level of detail. LOD1 indices 354 may point to sub-trees with an intermediate level of detail and LODN indices 356 may point to sub-trees with the lowest level of detail. Since the LOD indices themselves do not take up a lot of storage (e.g., only a few bytes), a substantial number of LOD indices may be kept in the geometry node pool, which may point to certain other pointers, which then may point to the sub-trees. In addition, although FIG. 3 shows multiple sub-trees corresponding to a set of indices, a single sub-tree may be identified by a set of indices, as well.

Referring back to FIG. 2, a graphics processing pipeline including traversal engine 244 and shader 246 may be implemented as part of the GPU that can execute multiple threads in parallel using stream processing. Shader 246 may output the processed frame data into frame buffer 248. Other types of parallel processing may also be used to increase the performance of the graphics processing pipeline. Additional details concerning the interactions among LOD processor 250, sub-tree LOD residency map 252, and sub-tree LOD recording map 254 are provided with respect to FIGS. 4 and 5. Although FIG. 2 shows a certain number of components of graphics processing system 200 arranged in a certain manner, there could be more or fewer components arranged differently. Moreover, the residency map may be implemented as either (1) a linked list where each list item contains a currently resident bounding volume ID and its associated memory pointer, (2) a fixed-length array with valid memory pointer entries for all currently resident bounding volume IDs, or (3) another implementation.

Figure 4:
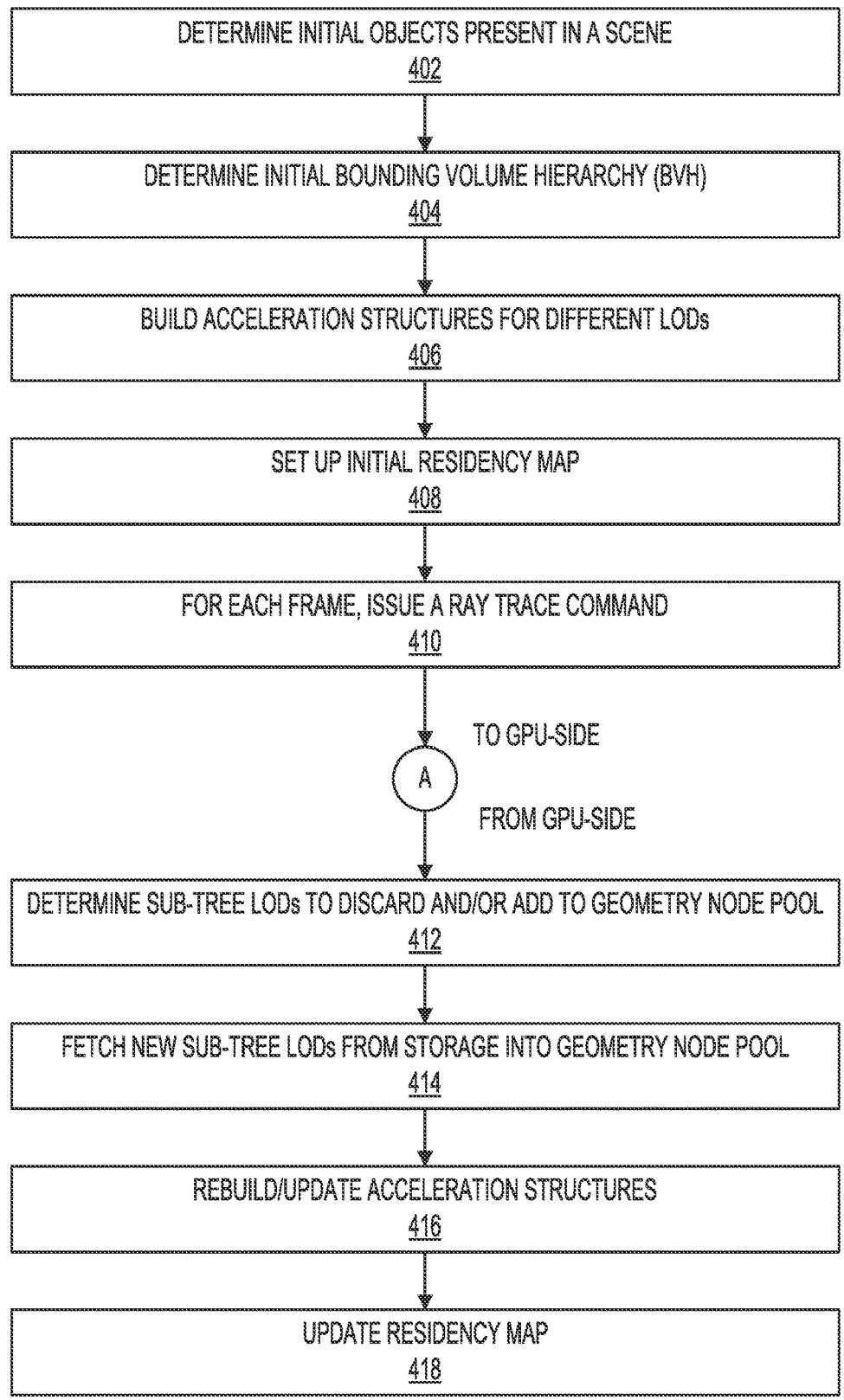
FIG. 4 shows a processing timeline for the tasks being performed on the CPU-side in accordance with one example.

FIG. 4 shows a processing timeline 400 for the tasks being performed on the CPU-side 210 of FIG. 2 in accordance with one example. Processing timeline 400 may include: (1) a first set of tasks (e.g., tasks 402, 404, 406, 408, and 410) after which the processing moves on to the GPU-side 240, and (2) a second set of tasks (e.g., tasks 412, 414, 416, and 418) that are performed after the GPU-side 240 has completed the tasks described with respect to processing timeline 500 of FIG. 5. As part of task 402, the CPU may determine initial objects and objects present in a scene. As part of task 404, the CPU may determine the initial bounding volume hierarchy (BVH). As explained earlier, the bounding volume hierarchy (BVH) may have a tree structure with one or more selectable sub-trees per node. In one example, there may be a bounding box node, pointers to child nodes, and geometry (e.g., triangles) at the leaf nodes. Next, as part of step 406, the CPU may build acceleration structure trees and sub-trees for different levels of detail (LODs). The acceleration structures may include both top-level acceleration structures (TLAS) and bottom-level acceleration structures (BLAS). As part of task 408, the CPU may set up an initial residency map. Once the CPU submits the ray trace command as part of task 410, the processing moves to the GPU-side 240.

Figure 5:
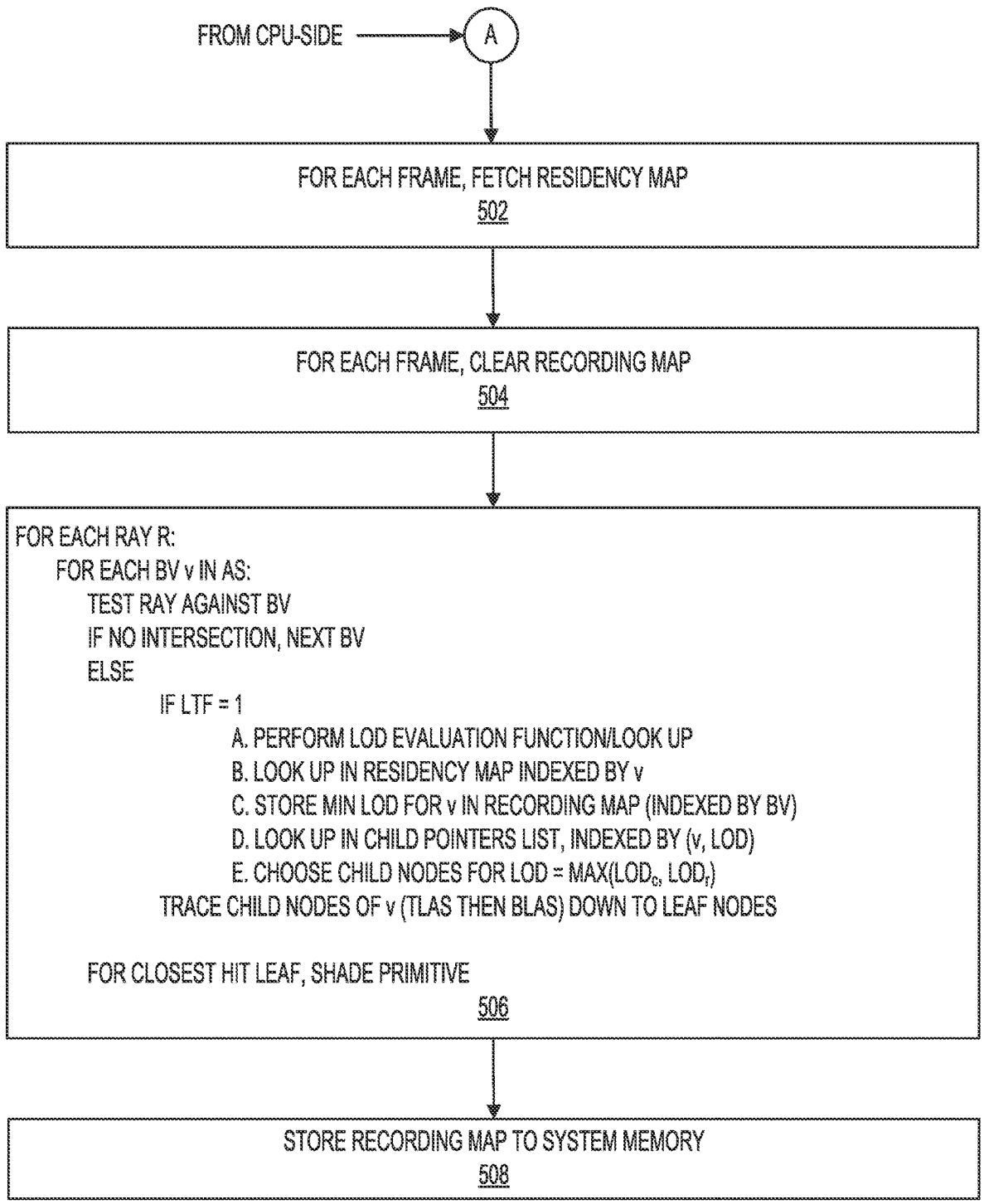
FIG. 5 shows a processing timeline for the tasks being performed on the GPU-side in accordance with one example.

FIG. 5 shows a processing timeline 500 for the tasks being performed on the GPU-side 240 of FIG. 2 in accordance with one example. Processing timeline 500 may be performed as a loop for a set of frames (e.g., N frames). As part of task 502, the traversal engine (e.g., traversal engine 244 of FIG. 2) may fetch the residency map for each frame. As explained earlier, each entry in the residency map may point to at least one location (e.g., via a pointer or via an index) of a level of detail for the sub-trees fetched into geometry node cache 242 of FIG. 2 or stored in geometry node pool 212 of FIG. 2. The residency map may also point to multiple locations for different levels of detail for the sub-trees indexed by bounding volumes. As part of task 504, the GPU may clear the recording map. As explained earlier, the recording map may be configured to store integer values representative of levels of detail for sub-trees as determined by the GPU. The recording map may be maintained and created by the GPU to keep a record of the processing of acceleration structures for the various sub-trees.

With continued reference to FIG. 5, task 506 may include performing the algorithm shown in FIG. 5 for each ray in a scene. The algorithm may include the traversal engine (e.g., traversal engine 244 of FIG. 2) for each bounding volume (e.g., BV indexed by volume v) in the acceleration structure (AS), testing the ray against bounding volume. If the traversal engine determined that there was no intersection between the ray and the bounding volume, then the next bounding volume is processed by the traversal engine. If, however, there is an intersection, between the ray and the bounding volume, then, the traversal engine checks the status of the LOD test flag (LTF). If the LTF is set (e.g., LTF=1), then several sub-tasks labeled A, B, C, D, and E are performed as part of the algorithm.

Still referring to FIG. 5, as part of sub-task A, LOD processor 250 of FIG. 2 may perform a level of detail (LOD) evaluation function or look up a table. The evaluation function may map bounding volume size to LOD values. An example evaluation function may be $LOD_c = maxLOD - \log_2(\max(dx, dy, dz))$, where $LOD_c$ is the calculated LOD value, maxLOD is a constant representing the maximum permissible (i.e., coarsest) level of detail value, and where dx, dy, and dz are the three dimensions of the bounding volume in screen space. Alternatively, instead of performing the evaluation function, the LOD processor 250 of FIG. 2 may look up a table that may store the LOD values for various bounding volume sizes. The determined LOD value is referred to as the computed LOD ($LOD_c$). Next, as part of sub-task B, the LOD processor may look up the residency map indexed by bounding volume to determine the resident LOD ($LOD_r$).

Still referring to FIG. 5, as part of sub-task C, the LOD processor (e.g., LOD processor 250 of FIG. 2) may update the recording entry for the sub-tree to the minimum value of the current LOD in the recording map (e.g., sub-tree LOD recording map 254 of FIG. 2) and the computed LOD ($LOD_c$). As part of this, the LOD processor may perform a read-modify-write to record the higher level of detail corresponding to the minimum value of the current LOD in the recording map and the computed LOD ($LOD_c$). In one example, the recording map may be set up as a searchable list that can be searched based on an identifier associated with a bounding volume. The entries in the searchable list may be hashed such that a hash search could be made to first determine whether the recording map contains an entry corresponding to the bounding volume.

With continued reference to FIG. 5, as part of sub-task D of the algorithm, traversal engine may look up a child pointers list that is indexed by volume and level of detail. As an example, Table 1 shows one such child pointer list that may be maintained by the traversal engine. As shown in Table 1, for each node ID associated with a bounding volume, the child pointers list may include the LOD for the node ID and children nodes, if any, of the bounding volume indexed by the node ID. Table 1 shows the bounding volume having node ID 2.1 as having an LOD of 0 and children with node IDs of 3.1a and 3.1b.

TABLE 1

| Node ID | LOD | Children |
|---------|-----|----------|
| 2.1a | 0 | 3.1a, 3.1b |
| 2.1a | 1 | a3, null |
| 2.1b | ... | ... |
| 2.1a | ... | ... |
| ... | ... | ... |

Next, as part of sub-task E of the algorithm, the traversal engine may choose child nodes from the acceleration structure tree with an LOD value that is the maximum of the computed LOD value ($LOD_c$) and the resident LOD value ($LOD_r$). In one example, the final LOD value ($LOD_f$) may be communicated to the traversal engine by the LOD processor after determining the maximum of the computed LOD value ($LOD_c$) and the resident LOD value ($LOD_r$). This way the final LOD value corresponds to a coarser representation because only the coarser representation is resident in the random access memory (RAM).

Figure 6:
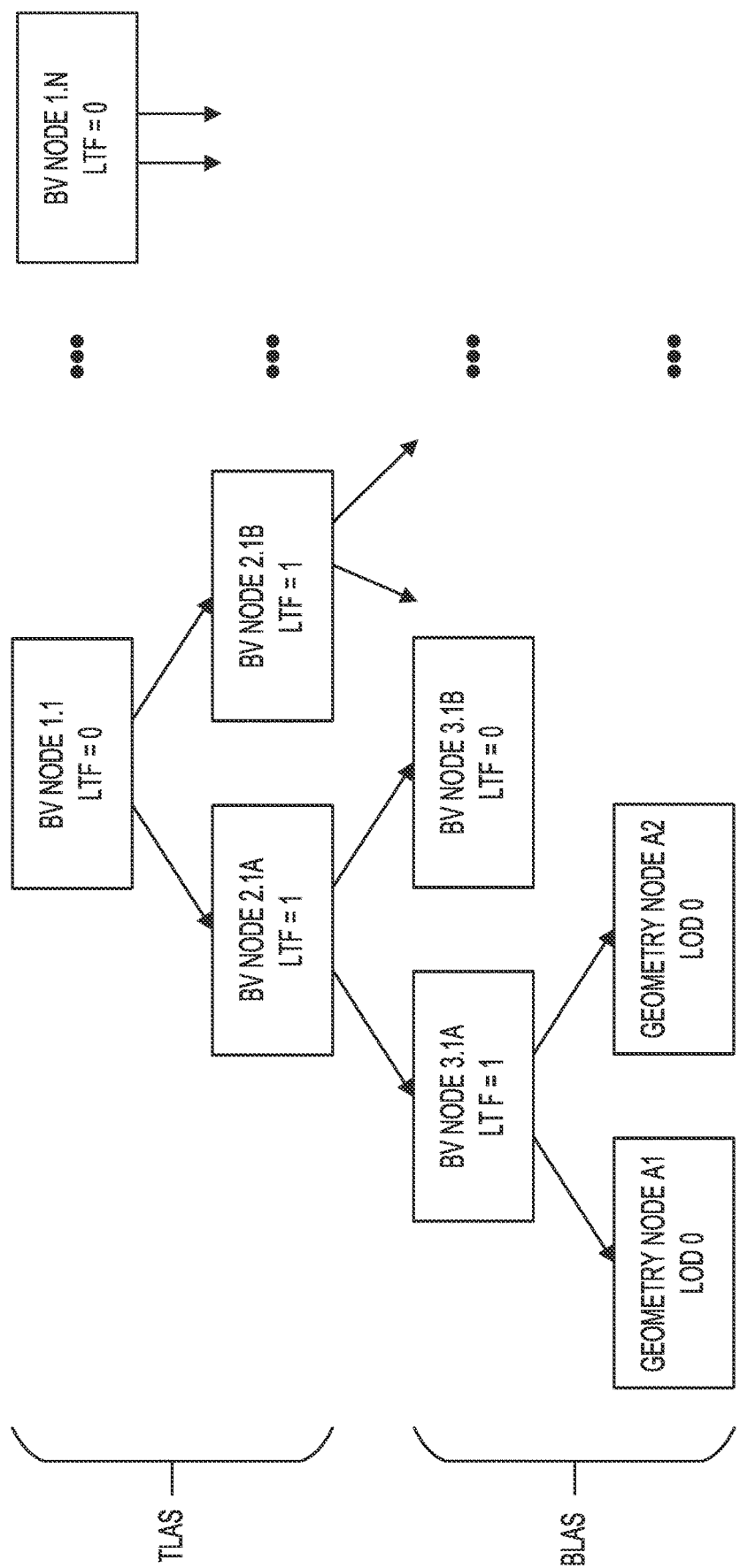
FIG. 6 shows traversal of the child nodes for an example frame when a higher level of detail is selected.
Figure 7:
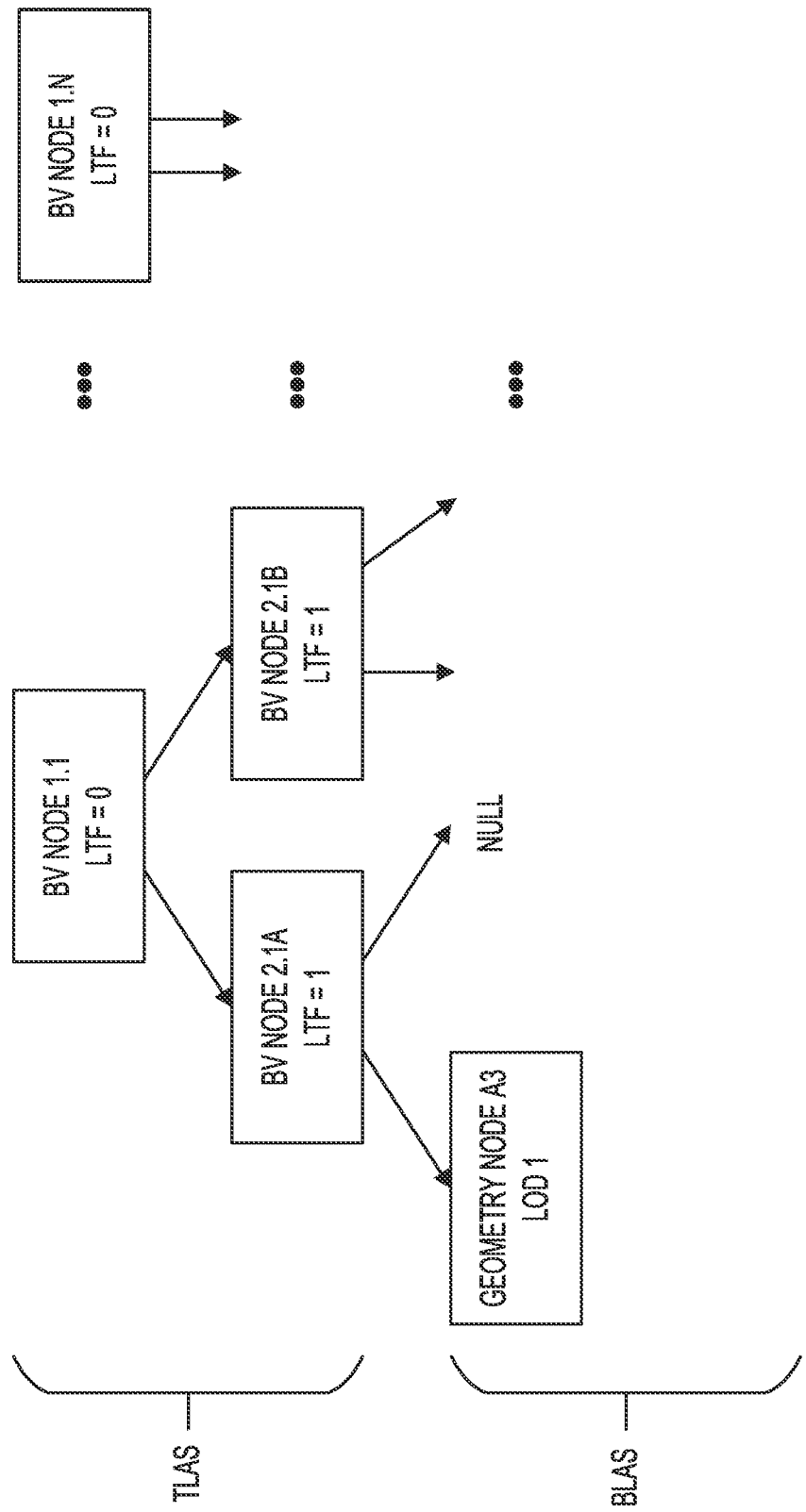
FIG. 7 shows the traversal of the child nodes for an example frame when a lower level of detail is selected.

The traversal engine may then trace child nodes of the bounding volume v down to the leaf nodes. FIG. 6 shows traversal of the child nodes for an example frame when a higher level of detail is selected. In contrast, FIG. 7 shows the traversal of the child nodes for an example frame when a lower level of detail is selected. FIG. 6 shows the acceleration structure tree as including both a top level acceleration structure (TLAS) and a bottom level acceleration structure (BLAS). In this example, the top level acceleration structure (TLAS) includes: BV node 1.1, BV node 1.N, BV node 2.1A, and BV node 2.1B. The bottom level acceleration structure (BLAS) includes: BV node 3.1A, BV node 3.1B, geometry node A1 and geometry node A2. FIG. 6 shows only a portion of the acceleration structure tree. The FIG. 6 example assumes that the higher level of detail is selected for bounding volume node 2.1A. As a result, child nodes BV node 3.1A and one of geometry node A1 or geometry node A2 are traced.

FIG. 7 also shows the acceleration structure tree as including both a top level acceleration structure (TLAS) and a bottom level acceleration structure (BLAS). In this example, the top level acceleration structure (TLAS) includes: BV node 1.1, BV node 1.N, BV node 2.1A, and BV node 2.1B. The bottom level acceleration structure (BLAS) includes: geometry node A3. FIG. 7 also shows only a portion of the acceleration structure tree. The FIG. 7 example assumes that a lower level of detail is selected for bounding volume node 2.1A. As a result, child node geometry node A3 is traced. In one example, the traversal engine may also interpolate between levels. This can be accomplished by calculating $LOD_c$ to include fractional precision. The magnitude of the fraction can be used, for example, to smoothly interpolate, or merge, fine detail geometry so that the number of primitives is between the finer and coarser integer LODs.

Finally, as part of task 508, the LOD processor may store the recording map for the frame (e.g., frame N−1) into the system memory. As an alternative, the system may be designed so that the CPU and GPU have shared access to the residency map and the recording map, obviating the need for copying; instead, the maps may be double buffered and exchanged via pointer swapping. As an example, sub-tree LOD recording map 254 may be stored into the CPU-side 210 system memory as frame N−1 sub-tree LOD recording map 224. Advantageously, the recording map for use with the CPU now contains LODs that are actually used even if they were not resident in the residency map previously, which in turn helps the CPU in determining the correct level of detail for the sub-trees for frame N (the next frame) to bring into the geometry node pool. This in turn helps reduce the amount of storage (e.g., DRAM) needed for storing the geometry node pool. In addition, there are bandwidth savings in terms of the GPU not having to fetch geometry for sub-trees from the geometry node pool that will not be required as part of processing the next frame. In sum, building the history of use of the sub-trees via the recording map and the residency map allows for substantial savings in terms of both memory capacity and memory bandwidth. Moreover, the LOD processor included in the GPU-side 240 helps off-load LOD processing from the CPU to the GPU. Although FIG. 5 shows the processing timeline 500 with a certain number of tasks and sub-tasks being performed in a certain order, the processing timeline 500 may include additional or fewer tasks and sub-tasks performed in a different order.

Referring back to FIG. 4, once the GPU-side 240 has completed the tasks described with respect to the processing timeline 500 of FIG. 5, the CPU-side 210 may perform additional tasks. As part of task 412, the CPU may determine sub-tree LODs to discard and/or add to the geometry node pool. As part of this process, the CPU may rely upon the historical usage data associated with the various LOD values as recorded via the recording map (e.g., frame N−1 sub-tree LOD recording map 224 of FIG. 2, and possibly saved copies from frame N−2, frame N−3, etc.). As part of task 414, the CPU may fetch new sub-tree LODs from the storage into geometry node pool. As part of task 416, the GPU may rebuild/update acceleration structures. Next, as part of task 418, the CPU may update the residency map stored in the system memory (e.g., memory 106 of FIG. 1 or another suitable system memory) to reflect the resident level of detail values. The tasks described with respect to the processing timelines in FIGS. 4 and 5 may be performed with both immediate mode rendering GPUs and tile-based deferred rendering (TBDR) style GPUs. Although FIG. 4 shows the processing timeline 400 with a certain number of tasks and sub-tasks being performed in a certain order, the processing timeline 400 may include additional or fewer tasks and sub-tasks performed in a different order.

FIG. 8 shows a flow chart 800 of a method implemented by a graphics processing system in accordance with one example. In one example, the steps described in this method may be performed by the graphics processing system 200 described earlier with respect to FIG. 2. Step 810 may include retrieving a first level of detail value for a sub-tree from a level of detail residency map corresponding to a bounding volume hierarchy of objects. In one example, this step may include performing task 502 described earlier with respect to FIG. 5. As part of task 502, the traversal engine (e.g., traversal engine 244 of FIG. 2) may fetch the residency map for the frame including the sub-trees for the bounding volume being processed. As explained earlier, each entry in the residency map may point to at least one location (e.g., via a pointer or via an index) of a level of detail for each existing sub-tree for a bounding volume in a geometry node pool created by the CPU. Each sub-tree may contain all of the nodes for the acceleration structure(s) corresponding to that sub-tree.

Step 820 may include determining a second level of detail value for the sub-tree. As explained earlier, in one example, this step may be performed only when the LOD test flag is set to a true value. This step may include performing sub-task A of the algorithm described as part of task 506 detailed earlier with respect to FIG. 5. As explained earlier, as part of sub-task A, LOD processor 250 of FIG. 2 may perform a level of detail (LOD) evaluation function or look up a table. The evaluation function may map bounding volume size to LOD values. An example evaluation function may be $LOD_c = maxLOD - \log_2(\max(dx, dy, dz))$. Alternatively, as part of step 820, instead of performing the evaluation function, the LOD processor 250 of FIG. 2 may look up a table that may store the LOD values for various bounding volume sizes. The determined LOD value is referred to as the computed LOD ($LOD_c$).

Step 830 may include selecting a final level of detail value for the sub-tree based on a comparison between the first level of detail value for the sub-tree and the second level of detail value for the sub-tree. In one example, step 830 may include performing sub-task E of the algorithm of task 506 of FIG. 5. As explained earlier, in one example, the final LOD value ($LOD_f$) may be communicated to the traversal engine by the LOD processor after determining the maximum of the computed LOD value ($LOD_c$) and the resident LOD value ($LOD_r$). This way the final LOD value corresponds to a coarser representation.

Step 840 may include, based on the final level of detail value for the sub-tree, selecting child nodes in an acceleration structure tree and trace the selected child nodes. In one example, this step may include performing sub-task E of the algorithm of step 506 of FIG. 6, such that the traversal engine may choose child nodes from the acceleration structure with an LOD value that is maximum of the computed LOD value ($LOD_c$) and the resident LOD value ($LOD_r$). The traversal engine may then trace child nodes of the bounding volume v down to the leaf nodes. FIG. 6 shows traversal of the child nodes for an example frame when a higher level of detail is selected. In contrast, FIG. 7 shows the traversal of the child nodes for an example frame when a lower level of detail is selected. Although FIG. 8 describes the steps in a certain order, they need not be performed in this order.

FIG. 9 shows a flow chart 900 of a method implemented by a graphics processing system in accordance with one example. In one example, the steps described in this method may be performed by the graphics processing system 200 described earlier with respect to FIG. 2. Step 910 may include, for each bounding volume associated with a set of rays for a frame, testing each of the set of rays against the bounding volume to determine an intersection. In one example, this step may include performing the testing of rays described with respect to task 506 of FIG. 5.

Step 920 may include performing several sub-steps for each ray that intersected with the bounding volume and the level of detail processing is required. As explained earlier, one way to determine whether the level of detail processing is required is to check whether the LOD test flag is set to a true value. The first sub-step for step 920 may include determining a computed level of detail value for a sub-tree indexed by the bounding volume. As explained earlier, this may include LOD processor 250 of FIG. 2 performing a level of detail (LOD) evaluation function or look up a table. The evaluation function may map bounding volume size to LOD values. An example evaluation function may be $LOD_c = maxLOD - \log_2(\max(dx, dy, dz))$. Alternatively, as part of step 920, instead of performing the evaluation function, the LOD processor 250 of FIG. 2 may look up a table that is configured to store the LOD values for various bounding volume sizes. The determined LOD value is referred to as the computed LOD ($LOD_c$).

The next sub-step of step 920 may include retrieving a resident level of detail value for the sub-tree indexed by the bounding volume. In one example, this sub-step may include performing task 502 described earlier with respect to FIG. 5. As part of task 502, the traversal engine (e.g., traversal engine 244 of FIG. 2) may fetch the residency map for the frame including the sub-trees for the bounding volume being processed. As explained earlier, each entry in the residency map may point to at least one location (e.g., via a pointer or via an index) of a level of detail for each existing sub-tree for a bounding volume in a geometry node pool created by the CPU. Each sub-tree may contain all of the nodes for the acceleration structure(s) corresponding to that sub-tree.

The next sub-step of step 920 may include determining a final level of detail value based on a comparison between the computed level of detail value for the sub-tree and the resident level of detail value for the sub-tree. In one example, this sub-step may include performing sub-task E of the algorithm of task 506 of FIG. 5. As explained earlier, in one example, the final LOD value ($LOD_f$) may be communicated to the traversal engine by the LOD processor after determining the maximum of the computed LOD value ($LOD_c$) and the resident LOD value ($LOD_r$). This way the final LOD value corresponds to a coarser representation.

The next sub-step of step 920 may include, based on the final level of detail value, selecting child nodes in an acceleration structure tree for the bounding volume and tracing the selected child nodes in the acceleration structure tree. In one example, this sub-step may include performing sub-task E of the algorithm of step 506 of FIG. 6, such that the traversal engine may choose child nodes from the acceleration structure with an LOD value that is maximum of the computed LOD value ($LOD_c$) and the resident LOD value ($LOD_r$). Traversal engine may then trace child nodes of the bounding volume v down to the leaf nodes. FIG. 6 shows traversal of the child nodes for an example frame when a higher level of detail is selected. In contrast, FIG. 7 shows the traversal of the child nodes for an example frame when a lower level of detail is selected. Although FIG. 9 describes the steps in a certain order, they need not be performed in this order.

In conclusion, the present disclosure relates to a graphics processing system to retrieve a first level of detail value for a sub-tree from a level of detail residency map corresponding to a bounding volume hierarchy of objects. The graphics processing system is to determine a second level of detail value for the sub-tree. The graphics processing system is to select a final level of detail value for the sub-tree based on a comparison between the first level of detail value for the sub-tree and the second level of detail value for the sub-tree. The graphics processing system is to, based on the final level of detail value for the sub-tree, select child nodes in an acceleration structure tree and trace the selected child nodes.

The level of detail residency map may correspond to levels of detail for sub-trees, and the level of detail residency map may be maintained by a central processing unit (CPU) associated with the graphics processing system. The graphics processing system is further configured to determine the second level of detail value by performing a lookup operation or by performing an evaluation function. The final level of detail value for the sub-tree may be selected as a maximum of the first level of detail value for the sub-tree and the second level of detail value for the sub-tree, where a higher level of detail value corresponds to a coarser representation.

The graphics processing system is configured to update a level of detail recording map, where a higher level of detail value corresponds to a coarser representation, with an updated level of detail value for the sub-tree, and where the updated level of detail value for the sub-tree is selected as a minimum of the second level of detail value for the sub-tree and a third level of detail value for the sub-tree obtained from a current level of detail recording map.

The updated level of detail recording map may be provided to a central processing unit (CPU) associated with the graphics processing system. The CPU is configured to process the updated level of detail recording map to determine sub-trees to be added or discarded from a geometry node pool maintained by the CPU.

In another example, the present disclosure relates to a method implemented by a graphics processing system. The method includes for each bounding volume associated with a set of rays for a frame, testing each of the set of rays against the bounding volume to determine an intersection. The method further includes upon determining an intersection between a ray and the bounding volume and upon determining that a level of detail processing is required for the bounding volume: determining a computed level of detail value for a sub-tree indexed by the bounding volume, retrieving a resident level of detail value for the sub-tree indexed by the bounding volume, determining a final level of detail value based on a comparison between the computed level of detail value for the sub-tree and the resident level of detail value for the sub-tree, and based on the final level of detail value, selecting child nodes in an acceleration structure tree for the bounding volume and tracing the selected child nodes in the acceleration structure tree.

As part of the method, the retrieving the resident level of detail value for the sub-tree may comprise obtaining the resident level of detail value from a level of detail residency map, where the level of detail residency map corresponds to levels of detail for sub-trees, and where the level of detail residency map is maintained by a central processing unit (CPU) associated with the graphics processing system. The final level of detail value may be selected as a maximum of the computed level of detail value and the resident level of detail value, where a higher level of detail value corresponds to a coarser representation.

The method may further comprise updating a level of detail recording map, where a higher level of detail value corresponds to a coarser representation, with an updated level of detail value for the sub-tree, and where the updated level of detail value for the sub-tree is selected as a minimum of the computed level of detail value for the sub-tree and a resident level of detail value for the sub-tree obtained from a current level of detail recording map. The method may further include providing an updated level of detail recording map to a central processing unit (CPU) associated with the graphics processing system. The CPU is configured to process the updated level of detail recording map to determine sub-trees to be added or discarded from a geometry node pool maintained by the CPU.

In yet another example, the present disclosure relates to a graphics processing system to, for each bounding volume associated with a set of rays for a frame, test each of the set of rays against the bounding volume to determine an intersection. The graphics processing system is further configured to, upon determining the intersection and upon determining that a level of detail processing is required for the bounding volume: determine a computed level of detail value for a sub-tree indexed by the bounding volume, retrieve a resident level of detail value for the sub-tree indexed by the bounding volume, determine a final detail value based on a comparison between the computed level of detail value for the sub-tree and the resident level of detail value for the sub-tree, and based on the final detail value, selecting child nodes in an acceleration structure tree for the bounding volume and tracing the selected child nodes in the acceleration structure tree.

The resident level of detail value may be obtained from a level of detail residency map, where the level of detail residency map corresponds to levels of detail for sub-trees, and where the level of detail residency map is maintained by a central processing unit (CPU) associated with the graphics processing system. The final level of detail value may be selected as a maximum of the computed level of detail value and the resident level of detail value, where a higher level of detail value corresponds to a coarser representation.

The graphics processing system may further be configured to update a level of detail recording map, where a higher level of detail value corresponds to a coarser representation, with an updated level of detail value for the sub-tree, and where the updated level of detail value for the sub-tree is selected as a minimum of the computed level of detail value for the sub-tree and a resident level of detail value for the sub-tree obtained from a current level of detail recording map. The updated level of detail recording map may be provided to a central processing unit (CPU) associated with the graphics processing system. The CPU may be configured to process the updated level of detail recording map to determine sub-trees to be added or discarded from a geometry node pool maintained by the CPU.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A graphics processing system comprising:
   a traversal engine, implemented within a graphics processing unit (GPU), configured to retrieve a first level of detail value from a level of detail residency map for a sub-tree corresponding to a bounding volume hierarchy of objects, wherein the level of detail residency map corresponds to levels of detail for sub-trees, and wherein the level of detail residency map is maintained by a central processing unit (CPU) associated with the graphics processing system;
   a level of detail (LOD) processor, implemented within the GPU, configured to, by performing a level of detail (LOD) function or by looking up a table, determine a second level of detail value for the sub-tree and provide the determined second level of detail value for the sub-tree to the traversal engine, wherein the LOD processor is further configured to update a recording entry for the sub-tree in a level of detail recording map and provide the updated level of detail recording map to the CPU associated with the graphics processing system; and
   wherein the traversal engine is further configured to: (1) select a final level of detail value for the sub-tree based on a comparison between the first level of detail value for the sub-tree and the determined second level of detail value for the sub-tree, and (2) based on the final level of detail value for the sub-tree, select child nodes in an acceleration structure tree and trace the selected child nodes.

2. The graphics processing system of claim 1, wherein the LOD function comprises an evaluation function.

3. The graphics processing system of claim 1, wherein the final level of detail value for the sub-tree is selected as a maximum of the first level of detail value for the sub-tree and the second level of detail value for the sub-tree, wherein a higher level of detail value corresponds to a coarser representation.

4. The graphics processing system of claim 1, wherein a higher level of detail value corresponds to a coarser representation, and wherein an updated level of detail value for the sub-tree is selected as a minimum of the second level of detail value for the sub-tree and a third level of detail value for the sub-tree obtained from a current level of detail recording map.

5. The graphics processing system of claim 1, wherein the CPU is configured to process the updated level of detail recording map to determine sub-trees to be added or discarded from a geometry node pool maintained by the CPU.

6. The graphics processing system of claim 1, wherein the CPU is configured to provide a command list to the traversal engine, and wherein the traversal engine is configured to process the command list.

7. The graphics processing system of claim 1, wherein the LOD processor is configured to off-load LOD processing from the CPU.

8. A method implemented by a graphics processing system, the method comprising:
for each bounding volume associated with a set of rays for a frame, testing each of the set of rays against the bounding volume to determine an intersection; and
upon determining an intersection between a ray and the bounding volume and upon determining that a level of detail processing is required for the bounding volume:
determining a computed level of detail value for a sub-tree indexed by the bounding volume,
retrieving using a traversal engine, implemented within a graphics processing unit (GPU), a resident level of detail value for the sub-tree indexed by the bounding volume, wherein retrieving the resident level of detail value for the sub-tree comprises obtaining the resident level of detail value from a level of detail residency map, wherein the level of detail residency map corresponds to levels of detail for sub-trees, and wherein the level of detail residency map is maintained by a central processing unit (CPU) associated with the graphics processing system,
updating a recording entry for the sub-tree and providing the updated level of detail recording map to the CPU associated with the graphics processing system;
determining a final level of detail value based on a comparison between the computed level of detail value for the sub-tree and the resident level of detail value for the sub-tree, and
based on the final level of detail value, selecting child nodes in an acceleration structure tree for the bounding volume and tracing the selected child nodes in the acceleration structure tree.

9. The method of claim 8, wherein the final level of detail value is selected as a maximum of the computed level of detail value and the resident level of detail value, and wherein a higher level of detail value corresponds to a coarser representation.

10. The method of claim 8, wherein a higher level of detail value corresponds to a coarser representation, and wherein an updated level of detail value for the sub-tree is selected as a minimum of the computed level of detail value for the sub-tree and a resident level of detail value for the sub-tree obtained from a current level of detail recording map.

11. The method of claim 10, wherein the CPU is configured to process the updated level of detail recording map to determine sub-trees to be added or discarded from a geometry node pool maintained by the CPU.

12. The method of claim 8, further comprising shading primitives for a leaf node associated with closest hit.

13. The method of claim 8, wherein the CPU is configured to provide a command list to the traversal engine, and wherein the traversal engine is configured to process the command list.

14. The method of claim 8, wherein a level of detail (LOD) processor is configured to off-load LOD processing from the CPU.

15. A graphics processing system to:
for each bounding volume associated with a set of rays for a frame, test each of the set of rays against the bounding volume to determines an intersection; and
upon determining an intersection between a ray and the bounding volume and upon determining that a level of detail processing is required for the bounding volume:
determine a computed level of detail value for a sub-tree indexed by the bounding volume,
retrieve using a traversal engine, implemented within a graphics processing unit (GPU), a resident level of detail value for the sub-tree indexed by the bounding volume by obtaining the resident level of detail value from a level of detail residency map, wherein the level of detail residency map corresponds to levels of detail for sub-trees, and wherein the level of detail residency map is maintained by a central processing unit (CPU) associated with the graphics processing system,
update a recording entry for the sub-tree and provide the updated level of detail recording map to the CPU associated with the graphics processing system,
determine a final level of detail value based on a comparison between the computed level of detail value for the sub-tree and the resident level of detail value for the sub-tree, and
based on the final level of detail value, selecting child nodes in an acceleration structure tree for the bounding volume and tracing the selected child nodes in the acceleration structure tree.

16. The graphics processing system of claim 15, wherein the final level of detail value is selected as a maximum of the computed level of detail value and the resident level of detail value, and wherein a higher level of detail value corresponds to a coarser representation.

17. The graphics processing system of claim 15, wherein a higher level of detail value corresponds to a coarser representation, and wherein an updated level of detail value for the sub-tree is selected as a minimum of the computed level of detail value for the sub-tree and a resident level of detail value for the sub-tree obtained from a current level of detail recording map.

18. The graphics processing system of claim 17, wherein the CPU is configured to process the updated level of detail recording map to determine sub-trees to be added or discarded from a geometry node pool maintained by the CPU.

19. The graphics processing system of claim 15, wherein the CPU is configured to provide a command list to the traversal engine, and wherein the traversal engine is configured to process the command list.

20. The graphics processing system of claim 15, wherein a level of detail (LOD) processor is configured to off-load LOD processing from the CPU.

* * * * *